United States Patent [19]

Wick

[11] Patent Number: 4,598,136
[45] Date of Patent: Jul. 1, 1986

[54] EMBEDDING MATERIAL AND PROCESS FOR THE PRODUCTION THEREOF

[75] Inventor: Gerhard Wick, Obernburg, Fed. Rep. of Germany

[73] Assignee: Akzo NV, Arnhem, Netherlands

[21] Appl. No.: 716,231

[22] Filed: Mar. 26, 1985

[30] Foreign Application Priority Data

Mar. 28, 1984 [DE] Fed. Rep. of Germany ....... 3411361

[51] Int. Cl.⁴ ..................... B01D 13/00; C08G 18/22; C08G 18/36
[52] U.S. Cl. .................................. 528/56; 210/321.2; 528/55; 528/58; 528/60; 528/74.5
[58] Field of Search .................... 528/60, 74.5, 55, 56, 528/58

[56] References Cited

U.S. PATENT DOCUMENTS

| | | | |
|---|---|---|---|
| 3,546,148 | 12/1970 | Diamond et al. | 528/74.5 |
| 3,549,569 | 12/1970 | Farah et al. | 528/74.5 |
| 3,892,713 | 7/1975 | Burkus et al. | 528/60 |
| 4,125,545 | 11/1978 | Kroplinski et al. | 528/67 |
| 4,224,164 | 9/1980 | Brauer et al. | 210/321 B |
| 4,256,617 | 3/1981 | Kroplinski et al. | 260/18 TN |
| 4,344,873 | 8/1982 | Wick | 528/60 |
| 4,391,964 | 7/1983 | Wick et al. | 528/74.5 |

FOREIGN PATENT DOCUMENTS 3040734  5/1981  Fed. Rep. of Germany .
156872  9/1982  Fed. Rep. of Germany .
157143 10/1982  Fed. Rep. of Germany .

*Primary Examiner*—Herbert S. Cockeram
*Attorney, Agent, or Firm*—Michael J. Striker

[57] ABSTRACT

Aliphatic embedding masses are disclosed, prepared by initially reacting one or more aliphatic diisocyanates with castor oil or a mixture of castor oil and further hydroxyl compounds, such as e.g., trimethylol propane into a NCO-group-displaying pre-adduct, and the pre-adduct is then hardened in a catalyzed reaction with a mixture containing castor oil, trimethylol propane and N-methyldiethanol amine. Preferably iron acetyl acetonate, dibutyl tin diacetate or titanium tetrabutylate are employed as catalysts. Isophoron diisocyanate is particularly suitable as diisocyanate.

The embedding masses are useful for the embedding of membranes, preferably membranes to be employed in medical fields. The embedding masses are bio-compatible, especially with regard to blood, and are non-toxic. They allow for the embedding of membranes with the aid of automatic machinery. The embedding masses display no or only negligible swelling when used in contact with blood, blood-like and aqueous systems.

20 Claims, No Drawings

EMBEDDING MATERIAL AND PROCESS FOR THE PRODUCTION THEREOF

BACKGROUND OF THE INVENTION

The invention concerns a polyurethane embedding material, based upon castor oil as well as further hydroxyl compounds, in particular trimethylol propane and aliphatic diisocyanates, its production and its use, particularly as embedding material for membranes.

Numerous embedding materials based upon polyurethanes are already known. Thus, for example, German Pat. No. 28 12 197 describes an embedding material for which, initially, a pre-adduct is produced from castor oil, trimethylol propane and a 2- to 4-fold excess of NCO-groups of an aromatic diisocyanate per equivalent OH-groups. This pre-adduct is then hardened with a mixture of castor oil and trimethylol propane, or even with castor oil alone. The so-prepared embedding material is suitable, in particular, for the embedding of membranes. Such embedded membranes have proved to be very useful, and have even been employed in various medical areas of use.

Under hydrolysis conditions, however, polyurethanes which are constructed from aromatic diisocyanates form, to a slight extent, aromatic amine compounds, which are suspected of possessing mutagenic or carcinogenic activity. For this reason, several countries have enacted very strict regulations for medically-employed arrangements, so as to have available embedding materials for the production of which only a very small amount, preferably no, aromatic compounds have been employed. For the preparation of medical devices such as modules for dialysis, hemofiltration, plasmaphoresis and the like, embedding materials are required which are resistant, i.e., they do not decompose or give off toxic compounds upon employment, which in other respects are bio-compatible, particularly blood-compatible and thereby are not physiologically objectionable.

Attempts have already been made to completely or partially substitute the aromatic diisocyanate upon production of embedding materials based upon polyurethane. Thus, for example, D.E.-O.S. 27 32 182 describes a stabilized pre-polymerizate for which the aromatic diisocyanate, 4,4'-diphenylmethane diisocyanate is substituted in part by a series of aliphatic diisocyanates, among others by isophoron diisocyanate. The materials described in this reference, are not, however, very hydrolysis stable, particularly through the presence of a polyester component. Moreover, biuret can be employed in the production of this embedding material, which makes it unsuitable for medical purposes. These embedding materials are thus predominantly employed for casting, filling, embedding and encapsulation of electrical components.

D.E.-A.S. No. 28 29 557 describes storage-stable free isocyanate group-containing pre-polymers based upon polyurethanes which still contain iron complex of acetyl acetone and/or acetyl acetic acid alkyl ester as catalyst. These pre-polymers can be employed, e.g., as lacquer solution, which hardens upon the working-in of water. The majority of pre-polymers employed in technical fields are suitable for medical purposes.

D.E.-O.S. No. 27 49 491 recommends numerous aromatic diisocyanates for the production of embedding materials. Indeed even aliphatic diisocyanates are mentioned there in general, although aromatic diisocyanates are preferably employed as building blocks for the production of these polyurethanes. As cross-linking agent, the reference mentions hydroxyl group-displaying esters of aliphatic carboxylic acids with at least 12 carbon atoms. However, difficulties occur upon the working up of such embedding materials and, moreover, the described compositions are physiologically hazardous.

D.E.-O.S. 31 49 527 likewise describes polyurethane masses which are supposed to be suitable as embedding material for hollow fibers in dialyzators. They have been prepared on the basis of castor oil, multi-functional hydroxyl compounds, as well as dissolving agents such as hydroxyl group-containing partial esters of long-chain carboxylic acids with co-employment of organotin compounds as catalysts and with the use of customary diisocyanate. However, the polyurethanes described in this Offenlegungsschrift are for a number of reasons hazardous from a physiological point of view. Thus, preferably, aromatic diisocyanates are recommended for construction of the polyurethane. The tin/-sulphur compounds mentioned therein as catalysts can act toxically. There are also objections against the employment of zeolites in parts which come into contact with blood. Finally, the employment of dissolving agents for embedding materials that are to be used in medical fields is dangerous.

The plurality of patent disclosures shows that it is extremely difficult to manufacture embedding materials with specific characteristics suitable for determined purposes of use. With many techniques it is necessary to insert great amounts of catalysts, which can have toxic effects and therefore meet with objections, particularly in the medical fields. On the other hand, the construction of polyurethanes is complicated, and through the insertion of higher-molecular substances, such as polyethers, polyesters, semi-esters and the like, the mechanical characteristics such as hardness are disadvantageously influenced.

Although numerous embedding materials based upon polyurethanes are already known, there still exists a need for improved embedding materials, as well as simple to perform processes for the production thereof, which do not possess the above-described disadvantages.

SUMMARY OF THE INVENTION

It is, therefore, an object according to the present invention to provide polyurethane embedding materials which are suitable in particular for the embedding of membranes that are supposed to be employed in the medical fields, as well as an appropriate process for the production thereof, which is performed on the basis of simply constructed starting materials.

It is an additional object according to the present invention to provide polyurethane embedding materials which upon production quickly possess the desired characteristics, in particular, an appropriate Shore Hardness, which are toxicologically harmless and with which embeddings are possible within shorter time periods, in particular even in automatically-operating arrangements.

It is a further objective of the present invention to provide embedding materials which are particularly suitable for the embedding of membranes that are supposed to be employed in the medical fields and which are resistant under the conditions of employment, in particular during longer contacts with aqueous systems and blood or blood-like compositions, which do not tend to hydrolyze, in particular do not tend to split off aromatic compounds, and which display no or only an insignificant degree of swelling.

These objects are attained according to the present invention by an embedding material obtained through the reaction of a stoichiometric excess of one or more aliphatic diisocyanates with castor oil and, if necessary, further hydroxyl compounds, into an NCO group-displaying pre-adduct, and then reaction of the pre-adduct in the presence of metal compounds as catalysts, with a chain-lengthener mixture containing castor oil, trimethylol propane and N-methyldiethanol amine. Preferably, a pre-adduct is employed which has been obtained through the reaction of an aliphatic diisocyanate with a mixture of castor oil and trimethylol propane. Isophoron diisocyanate is particularly suitable as aliphatic diisocyanate. Also hexamethylene diisocyanate and trimethylhexamethylene diisocyanate are very suitable as aliphatic diisocyanates.

Iron acetyl acetonate, dibutyl tin diacetate, dibutyl tin dilaurate and titanium tetrabutylate are preferred as metal compounds.

A process serves for the production of such an embedding material through reaction of a stoichiometric excess of one or more aliphatic diisocyanates with castor oil and, if necessary, further hydroxyl compounds, into an NCO group-displaying pre-adduct and catalyzed reaction of the pre-adduct with the chain-lengthener mixture containing castor oil and trimethylol propane, which is thereby characterized in that the pre-adduct is prepared from one or more aliphatic diisocyanates and castor oil and, if necessary, further hydroxyl compounds, and the stoichiometric excess of the aliphatic diisocyanate, relative to the OH-groups of the hydroxyl compound, amounts to at least 1 val, and the obtained pre-adduct is hardened in the presence of catalytic amounts of a metal compound with a mixture containing castor oil, trimethylol propane and N-methyldiethanol amine. Isophoron diisocyanate is particularly suitable as aliphatic diisocyanate. Hexamethylene diisocyanate and trimethylhexamethylene diisocyanate are also expedient. As metal compound, preferably iron acetyl acetonate is employed, expediently in amounts from 0.01 up to 0.3, more preferably from 0.02 up to 0.1 weight-percent, relative to the total amount of the starting materials.

The chain-lengthener mixture is composed, preferably, in a ratio from 3 to 5.5 Val castor oil, 0.5 up to 2.0 Val trimethylol propane and 1 up to 2.5 Val N-methyldiethanol amine and is employed, relative to the hydroxy groups, in a stoichiometric excess of the NCO groups of the pre-adduct. It is advantageous to employ two to six Val aliphatic diisocyanate per Val castor oil respectively Val mixture of castor oil/ further hydroxyl compound for the production of the pre-adduct.

In a particularly advantageous embodiment of the process according to the present invention, a pre-adduct is employed displaying an NCO content from 16 to 22, particularly from 18.0 to 20.0 percent by weight, for the reaction with the chain-lengthener mixture.

The embedding material is particularly suitable as embedding material for membranes, especially membranes which are supposed to be employed in the medical fields.

The aliphatic diisocyanate which comes into consideration within the scope of the present invention can be employed alone or also in mixture.

Isophoron diisocyanate, also named 3-isocyanatomethyl-3,5,5-trimethylcyclohexylisocyanate, which is preferably employed, is a diisocyanate which displays two isocyanate groups having different reactivities. Although the cycloaliphatically-bound isocyanate group reacts ten times more slowly than the aliphatically bound group, it is possible to perform the embedding quickly, whereby the reaction period is, however, sufficient in order to be able to appropriately embed the membranes before hardening of the embedding material.

It is self-evident that the employed diisocyanate should be used in high purity, free to the utmost of contaminants which could provide a toxic effect in the embedding material.

The trimethylhexamethylene diisocyanate employed according to the present invention, can be not only 2,2,4-trimethylhexamethylene diisocyanate, but also 2,4,4-trimethylhexamethylene diisocyanate or even as an isomer mixture.

As further aliphatic diisocyanates, mention may be made by way of example of dicyclohexylmethane diisocyanate-(4,4').

Castor oil, such as is employed within the scope of the present invention, should likewise be provided with a high degree of purity, and as water-free as possible.

For construction of the pre-adduct, the castor oil can be employed alone or in suitable mixture with hydroxyl compounds. Trimethylol propane is particularly suitable as a further hydroxyl compound which can be employed with castor oil.

Instead of trimethylol propane, other triols such as, e.g., glycerin can be co-employed. Moreover, glycols such as, e.g., neopentyl glycol and butanediol, can be employed together with the castor oil.

By means of the co-employment of further hydroxyl compounds in addition to the castor oil, one is able to regulate the viscosity of the pre-adduct, whereby addition of trimethylol propane provides a viscosity-increasing effect.

The trimethylol propane is preferably initially dissolved in the castor oil, and then in mixture with the castor oil, reacted with an excess of diisocyanate for the production of pre-adduct. This manner of operation proves to be more advantageous as when one provides the diisocyanate, castor oil and trimethylol propane simultaneously though not pre-mixed into a reaction vessel.

Castor oil, if necessary in mixture with further hydroxyl compounds, is reacted into the pre-adduct with a stoichiometric excess of the aliphatic diisocyanate, e.g., per OH group of the castor oil or the mixture of castor oil and further hydroxyl compounds, more than 1 NCO group derived from the diisocyanate are employed. Preferably, for each OH group, at least two isocyanate groups are employed, i.e., the excess of the diisocyanate amounts to at least 1 Val.

In addition to the stoichiometric adjustment of the NCO groups to OH groups, it is favorable if one provides for the weight ratio of the NCO groups in the pre-adduct to be correspondingly determined. It has thus been shown that ratios of 16 to 22 percent by weight isocyanate in the pre-adduct, particularly 18.0 up to 20.0 percent by weight, are particularly advantageous. The relative portion of aliphatic diisocyanates and castor oil or castor oil and further hydroxyl compounds in order to obtain such NCO content can be simply calculated from the molecular weight of the employed compounds.

The pre-adduct, which particularly requires stoichiometric excesses of aliphatic diisocyanate can contain, in addition to the addition compounds arising from diisocyanate and castor oil or castor oil and further hydroxyl compounds, also still unreacted aliphatic diisocyanate, is reacted with the chain-lengthener mixture which contains small amounts of metal compounds as catalysts. For the reaction, one can employ the pre-adduct, also named the A-component, previously prepared and from stock, since it is stable as such over long periods of time. The so-called B-component, i.e., the chain-lengthener mixture, can likewise be separately prepared and then stored until it is required. The hardening is performed by mixing the A- and B-components in appropriate amounts with one another, and, preferably, also performing an appropriate degasification. The embedding of the membranes, in particular hollow fiber membranes, occurs preferably according to the so-called centrifugal casting technique, such as is described, e.g., in German Pat. No. 1,544,107. One can, however, also employ other embedding techniques known to the skilled man of the art. The so-called A- and B-components, i.e., the pre-adduct and the chain-lengthener mixture, are employed in amounts that provide a slight stoichiometric NCO group excess. The molar ratio of NCO groups to hydroxyl groups of the chain-lengthener expediently lies in the range from 1.01 to 1.3:1. It is also advantageous when the NCO group content for the hardening is not only selected corresponding to the given mole ratios, but when it also exists—with regard to its excess—in a determined weight ratio to the total amount of starting components, i.e., to the total weight of components A and B, the pre-adduct and the cross-linking agent. It is advantageous when the NCO group excess amounts to between 0.1 and 2 percent by weight, relative to the entire starting mixture preferably between 0.3 and 1 percent by weight.

In addition, it is favorable when the components A and B are so determined in regard to one another that corresponding to the above statements, which involve the mol ratios, they are also employed in weight amounts relative to one another whereby about 40 to 60 parts component A are blended with 60 to 40 parts component B. With these weight ratios of components A and B a particularly good intermixing and uniform hardening are obtained.

It is advantageous if the pre-adduct, which is blended with component B, displays a viscosity up to about maximum 10 Pa.s. The viscosity can be adjusted to an appropriate value by co-employing a triol, namely, trimethylol propane, which acts to increase viscosity, in addition to the castor oil. Iron acetyl acetonate is particularly suitable as metal compound which is co-employed in catalytic amounts for the hardening. Also useful are appropriate tin compounds, particularly dibutyl tin diacetate. Further useful tin catalysts are, e.g., dibutyl tin dilaurate and di-N-butyl tin dinonanoate. As titanium compounds, among others customary titanium alkylate can be employed, such as, e.g., titanium tetrabutylate. Also suitable are compounds which in addition to titanium, contain still another metal atom, e.g., titanium magnesium hexaalkylate.

It is particularly advantageous when the employed catalysts are dissolved initially in the N-methyldiethanol amine co-employed for the hardening, after which this solution is filtered. The solution of a metal compound in N-methyldiethanol amine can be prepared in advance and stored as a stock solution, ready for mixing with further chain-lengtheners as needed. In this manner it is possible to obtain a homogeneous distribution of the catalyst not only in the chain-lengthener mixture, but also in the total reaction mixture after the addition of the pre-adduct.

It was particularly surprising that according to the present invention one can obtain not only embedding material which is harmless from a physiological point of view, but that it is also possible to obtain a material which is very suitable for the embedding of membranes, particularly membranes which are supposed to be employed in the medical fields. The hardening periods are very favorable, so that it is possible to perform the embedding of the membranes even with the aid of so-called automatons. With such automatically operated embedding techniques, it is also possible to appropriately effect determination of gelation periods and to have a favorable viscosity behavior during the hardening. The hardening should not begin too quickly, so that it is still possible to bring the membranes to be embedded in the embedding mixture composed of the components A and B, such as is practiced, e.g., with the centrifugal casting technique. On the other hand, the mixture should harden as quickly as possible after the embedding, and in as brief a period as possible become so hardened that the embedded membranes can be removed from the embedding apparatus. It is, moreover, a great advantage that the process according to the present invention makes it possible to manufacture embedding materials which display hardnesses as are required for embeddings, in particular, an excellent Shore-A Hardness.

A further advantage of the embedding masses according to the present invention is the fact that they do not swell at all or only to a negligible extent under operating conditions, i.e., when they come into contact, e.g., with blood, blood-like systems or aqueous systems.

With the process according to the present invention, it is, moreover, possible to manufacture embedding material with satisfactory characteristics while using only minimal amounts of catalysts. It is thus possible to obtain satisfactory results using less ppm metal compounds. This is particularly significant for medical uses in which materials are required which contain the least possible amounts of catalyst residue. The amounts required according to the present invention are so low that they provide no toxic effects upon use of the embedding materials.

It was also particularly surprising that by means of the co-employment of N-methyldiethanol amine as component of the chain-lengthener mixture, embedding materials are obtained with such outstanding characteristics. It is first possible through the co-employment of this compound to obtain such outstanding physiological and mechanical characteristics. When embedding materials are manufactured in otherwise similar manner, however without co-employment of N-methyldiethanol amine and using aliphatic diisocyanates, they do not acquire such good mechanical characteristics and are usually so soft that they cannot be employed.

The novel features which are considered characteristic of the present invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

Example 1: Preparation of the Pre-adduct (A component)

4479.4 g of isophoron diisocyanate are provided in a nitrogen-rinsed three-neck flask at room temperature. This amounts to 11.0 Val. With stirring, 2520.6 g of castor oil (2.0 Val) are added. Further nitrogen is then conducted through the vessel. It is heated within the period of one hour to an interior temperature of 120° C., after which the mixture is allowed to react for three hours at 120° C. The isocyanate content of the resulting pre-adduct should, after cooling down to room temperature, lie below the theoretical value of 19.8 percent by weight. It does turn out generally to be 19.3 percent. The dynamic viscosity of the A-component is measured at 20° C. and amounts to about 2.75 Pa.s (Haake Viscosimeter).

Example 2: Production of a Catalyst Stock Preparation 16.28 g of iron acetyl acetonate are dissolved in 820.72 g of N-methyldiethanol amine for three and one half hours at 80° C. with stirring and under nitrogen throughput, and then still in warm state, filtered through glass suction filters.

Example 3: Preparation of the B-component 5686.35 g of castor oil (3.0 Val), 492.93 g of trimethylol propane (2.0 Val) and 820.72 g of N-methyl diethanol amine (2.5 Val) according to the stock preparation with acetyl acetonate are blended with one another and slowly heated to 80° C. After two hours the components are completely and homogeneously mixed together. The B-component is then ready for use. The dynamic viscosity of the B-component amounts to 0.855 Pa.s(Haake Viscosimeter) at 20° C. Both the components A and B are blended together in a weight ratio of 56.75:43.25, and then employed in known manner for the embedding of a hollow fiber bundle by means of the centrifugal casting technique. Objection-free embeddings are obtained, with outstanding adhesion of the embedding mass.

Further compositions for the B component (chain-lengthener) are set forth in the following Table:

TABLE I

| DESIGNATION | 2 | 3 | 4 | 5 | 6 | 7 | 8 |
|---|---|---|---|---|---|---|---|
| Val castor oil (EW 344) | 4.0 | 3.5 | 3.0 | 4.5 | 4.0 | 3.5 | 5.5 |
| Val TMP (EW 44.73) | 1.0 | 1.5 | 2.0 | 2.0 | 2.0 | 2.0 | 1.0 |
| Val N—MDEA (EW 59.58) | 2.5 | 2.5 | 2.5 | 1.0 | 1.5 | 2.0 | 1.0 |
| 1 Val B (Eq-wt., theor.) | 209.28 | 189.34 | 169.39 | 226.27 | 207.31 | 188.35 | 266.17 |
| Wt. % castor oil | 87.66 | 84.79 | 81.23 | 91.22 | 88.50 | 85.23 | 94.77 |
| Wt. % TMP | 2.85 | 4.72 | 7.04 | 5.27 | 5.75 | 6.33 | 2.24 |
| Wt. % N—MDEA | 9.49 | 10.49 | 11.73 | 3.51 | 5.75 | 8.44 | 2.98 |
| Dyn. viscosity n at 20° C. in Pa · s | 0.92 | 0.95 | 1.12 | 1.30 | 1.20 | 1.20 | 1.15 |

TMP = trimethylol propane
N—MDEA = N—methyldiethanol amine

The mixtures of B component set forth in the Table are each employed with 0.1% by weight, 0.05% by weight, 0.03% by weight and 0.01% by weight iron acetyl acetonate, whereby the catalyst is added in a manner analogous to the technique for the production of the stock preparation. In similar manner, the B component according to the Table are prepared using 500 ppm, 300 ppm, 200 ppm and 100 ppm dibutyl tin dilaureate, whereby the ppm amounts refer to the tin, calculated as elemental tin.

It will be understood that each of the elements described above, or two or more together, may also find a useful application in other types of adhesive or filling materials different from the types described above.

While the invention has been illustrated and described as embodied in embedding materials and a process for the production thereof, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Embedding material produced by a reaction of a stoichiometric excess of one or more aliphatic diisocyanates with castor oil, with or without further hydroxyl compounds, into a NCO group-displaying pre-adduct and reaction of the pre-adduct in the presence of metal compound as catalyst, with a chain-lengthener mixture containing castor oil, trimethylol propane and N-methyldiethanol amine.

2. The embedding material according to claim 1, wherein a pre-adduct is employed that has been obtained by reaction of an aliphatic diisocyanate with a mixture of castor oil and trimethylol propane.

3. The embedding material according to claim 1, wherein isophorone diisocyanate is employed as diisocyanate.

4. The embedding material according to claim 1, wherein hexamethylene diisocyanate is employed as aliphatic diisocyanate.

5. The embedding material according to claim 1, wherein trimethylhexamethylene diisocyanate is employed as aliphatic diisocyanate.

6. The embedding material according to claim 1, wherein iron acetyl acetonate is employed as metal compound.

7. The embedding material according to claim 1, wherein dibutyl tin diacetate is employed as metal compound.

8. The embedding material according to claim 1, wherein titanium tetrabutylate is employed as metal compound.

9. Process for the production of an embedding material according to claim 1, through reaction of a stoichiometric excess of one or more aliphatic diisocyanates with castor oil, with or without further hydroxyl compounds, into a NCO-group-displaying pre-adduct and the further catalyzed reaction of the pre-adduct with a chain-lengthener mixture containing castor oil, trimethylol propane, and N-methyldiethanolamine, characterized in that the stoichiometric excess of aliphatic diisocyanate relative to the OH-groups of the hydroxyl compound amounts to at least 1 Val and the catalyzed reaction is carried out in the presence of catalytic amounts of a metal compound.

10. The process according to claim 9, wherein isophorone diisocyanate is employed as aliphatic diisocyanate.

11. The process according to claim 9, wherein hexamethylene diisocyanate is employed as aliphatic diisocyanate.

12. The process according to claim 9, wherein trimethylhexamethylene diisocyanate is employed as aliphatic diisocyanate.

13. The process according to claim 9, wherein iron acetyl acetonate is employed as metal compound.

14. The process according to claim 13, wherein said iron acetyl acetonate is employed in amounts from 0.01 up to 0.3% by weight, relative to the total amount of starting materials.

15. The process according to claim 14, wherein said iron acetyl acetonate is employed in amounts from 0.02 to 0.1% by weight.

16. The process according to claim 9, wherein a chain-lengthener mixture containing castor oil in an amount from 3 to 5.5 Val, trimethylol propane in an amount from 0.5 to 2.0 Val and N-methyldiethanol amine in an amount from 1.0 to 2.5 Val is employed in stoichiometric deficiency with regard to its hydroxyl groups relative to the NCO-groups of the pre-adduct.

17. The process according to claim 9, wherein per Val castor oil or Val mixture of castor oil and further hydroxyl compounds, 2 to 6 Val aliphatic diisocyanate are employed for production of the pre-adduct.

18. The process according to claim 9, wherein a NCO-group-displaying pre-adduct is employed which has an NCO-content from 16 to 22% by weight.

19. The process according to claim 18, wherein said pre-adduct has an NCO-content from 18.0 to 20.0% by weight.

20. The process according to claim 9, wherein said metal compound is provided in a filtered solution of N-methyldiethanol amine.

* * * * *